Sept. 10, 1935.    G. STEERUP    2,013,675
CONTAINER
Filed April 24, 1931
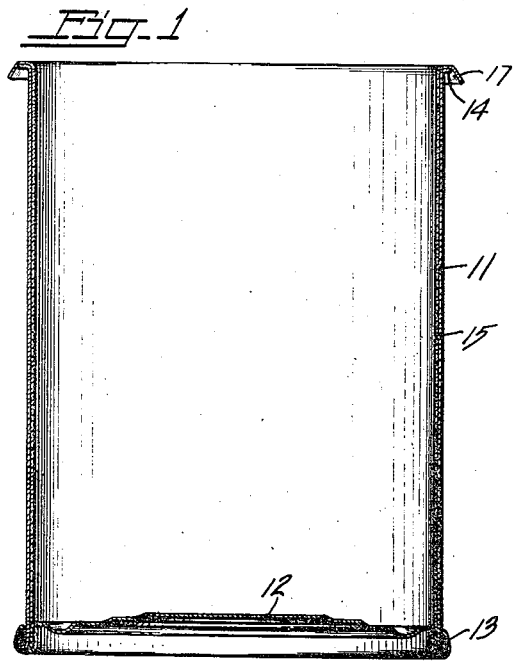
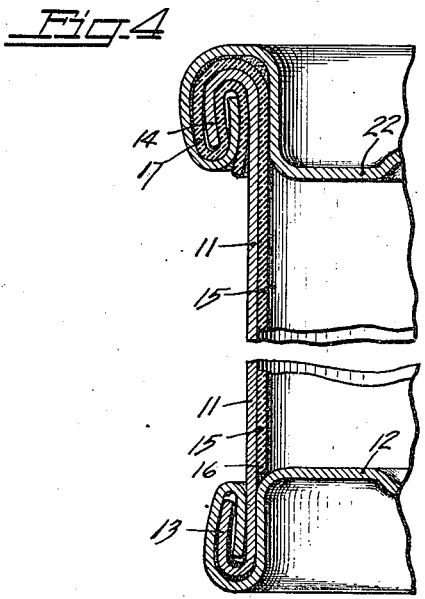
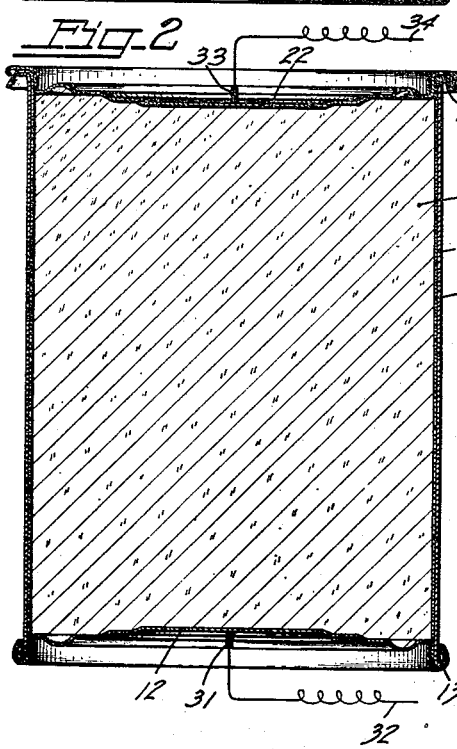
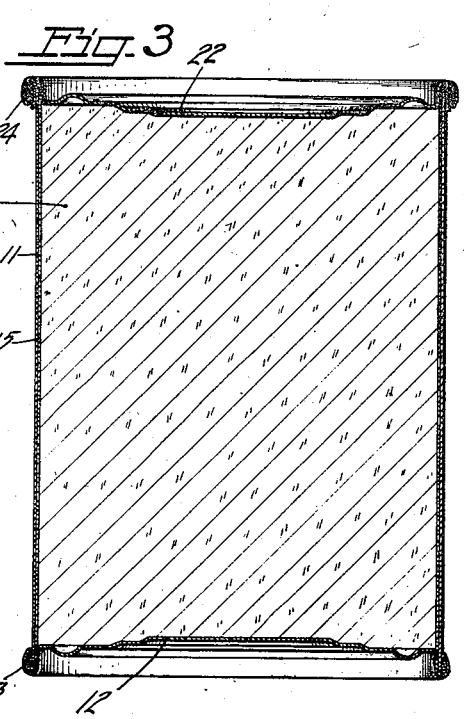
INVENTOR
Godfrey Steerup
BY
John C. Carpenter
ATTORNEY Patented Sept. 10, 1935

2,013,675

UNITED STATES PATENT OFFICE 2,013,675

CONTAINER

Godfrey Steerup, Maywood, Ill., assignor to American Can Company, New York, N. Y., a corporation of New Jersey Application April 24, 1931, Serial No. 532,451

5 Claims. (Cl. 204—24)

The present invention relates to a container for holding and preserving a product which is electrically sterilized after being placed therein. It has particular reference to a metallic container adaptable to hermetic sealing for holding and preserving a product which, while in the can, is adapted to processing by electrical sterilization. For such a purpose the improved container is formed of sheet metal in the usual way and one end thereof is insulated from the body and from the opposite end, the inside surfaces of the body are electrically separated from the product so that an electrical sterilizing current may be applied to the metallic ends and current caused to flow through the enclosed product which is thereby electrically sterilized.

The principal object of the present invention is the provision of a container adapted to permit electrical sterilization of an enclosed product by a simple form of sterilizing apparatus.

An important object of the invention is the provision of an insulating material for a metallic container which insures the proper flow of electrical energy through the product sealed within the container when the same is subjected to electrical sterilization.

An important object of the invention is the provision of a lining material for a metallic container which is incorporated in the seam connecting one end of the container with the body and which extends adjacent the inside walls of the container to prevent short-circuiting or cross-currents when an electrical sterilizing current is applied to the sealed ends of the container.

Numerous other objects of the invention will be apparent as it is better understood from the following description, which, taken in connection with the accompanying drawing, discloses a preferred embodiment thereof.

Referring to the drawing:

Figure 1 illustrates in longitudinal section an open container with an insulating liner, exemplifying the present invention;

Fig. 2 is a view similar to Fig. 1 illustrating the container filled with a product and a cover or end applied thereto, and in condition for electrical sterilization;

Fig. 3 is a view similar to Fig. 1 illustrating the filled container completely sealed; and Fig. 4 is an enlarged sectional detail of parts of the sealed container.

For the purpose of more clearly setting forth the present invention, there is disclosed in the drawing a metallic container comprising a body 11 and a bottom end 12 secured thereto in a double seam 13, the upper end of the body 11 being flanged outwardly at 14 in the usual manner.

A liner 15 is provided for the container being formed of a suitable material which is non-conductive of electrical current and which provides an insulation for the container. The lower end of the liner 15 is preferably arranged closely adjacent to the double seam 13 as illustrated at 16 (Fig. 4). Thus arranged, the wall of the liner 10 completely protects the interior wall of the container body 11 as shown. The liner 15 is preferably extended beyond the flange 14 of the body 11 as illustrated at 17 (Figs. 1 and 2).

A satisfactory form of liner for the present purpose has been found to be sheet asbestos which is preferably impregnated with a suitable liquid substance such as the usual can enamel to render the liner stiffer and thoroughly non-porous. Such a material so treated offers a maximum of insulating properties for the liner.

The lined container, illustrated in Fig. 1, is filled with the desired product and the top can end placed tightly upon it. The outwardly extending flange 17 of the liner insulating the can end 22 from the can body wall 11 and two electrodes 33 and 31, respectively included in an electric circuit by wires 34 and 32, are pressed or brought into electrical contact with the two can ends and sufficient current passed through the product to effect the desired sterilization. The liner 15 electrically separates the product from the can body so that the current in passing through the product travels along longitudinal lines. After sterilization is complete, the top can end 22 is seamed to the body by the usual double seam 24.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A container for electrically sterilizing a product, comprising a metallic body, a metallic end secured to said body and having electrical contact therewith, a fibrous liner of electrically insulating material located adjacent to and inside of the walls of said body and extended beyond an edge thereof, and a second metallic end engaging the said liner and insulated from said body by said liner.

2. A container for electrically sterilizing and preserving a product, comprising a metallic body, a metallic end hermetically secured to said body and having electrical contact therewith, an insulating material adjacent the inside walls of said body, and a second metallic end hermetically secured to said body but electrically insulated therefrom by said insulating material.

3. A container for use in electrically sterilizing a product, to aid in the preservation of the product, comprising a metallic body and metallic ends, said parts being united to form a receptacle which is hermetically closed, and a material which is an insulator of electric current, said insulator covering the interior surface of the body and having an end portion interposed between the body and an end, and electrically insulating the body from an end and from the contents of the container.

4. A container for use in electrically sterilizing a product packed therein, to aid in the preservation of the product, comprising a metallic body and metallic ends, said parts being united to form a receptacle which is hermetically closed, one of said ends being electrically insulated from the body, whereby an electrical sterilizing current may be passed from one of said ends to the other and longitudinally through the packed contents of the container, and means for preventing the passage of said current laterally from said contents to said body at points intermediate said ends.

5. A container for electrically sterilizing and preserving a product, comprising a metallic body, a metallic end hermetically secured to said body and having electrical contact therewith, an insulating liner of asbestos impregnated with enamel adjacent the inside walls of said body, and a second metallic end hermetically secured to said body but electrically insulated therefrom by said insulating liner.

GODFREY STEERUP.